*INVENTOR.*
CHARLES K. GRAVLEY
*BY*
Harris A. Munn Jr.
ATTORNEY

Nov. 25, 1958

C. K. GRAVLEY

FABRICATING DIELECTRIC ELECTROMECHANICAL TRANSDUCER ELEMENTS 2,861,320

Filed March 18, 1953

2 Sheets-Sheet 1

*INVENTOR.*
CHARLES K. GRAVLEY
*BY*
Harries A. Mumma Jr.
ATTORNEY 2,861,320

FABRICATING DIELECTRIC ELECTROMECHANICAL TRANSDUCER ELEMENTS

Charles K. Gravley, Lakewood, Ohio, assignor, by mesne assignments, to Clevite Corporation, Cleveland, Ohio, a corporation of Ohio Application March 18, 1953, Serial No. 343,056

19 Claims. (Cl. 29—25.35)

This invention relates to methods of fabricating dielectric elements with particular utility as applied to electrochemical transducer elements, and more especially to the fabrication of such elements containing openings or holes the internal surfaces of which are to be provided with conductive electrodes.

This application is a continuation-in-part of my application for Letters Patent of the United States Serial No. 288,566, filed on or about May 17, 1952, now Patent No. 2,768,421 issued October 30, 1956, and assigned to the same assignee as the present invention. This copending application discloses and claims a method of making electrical connections to an electromechanical transducer unit having two plates of electromechanically sensitive material assembled face to face. This transducer unit is provided with an inner electrode between the two plates and outer electrodes on the exposed surfaces, but margins are left separating these outer electrodes from one edge of the unit, and temporary electrical connections are made to only the inner electrode by pressing that edge of the unit against yieldable conducting means.

The proposal of providing an inner or central electrode in an electromechanically sensitive transducer body is not new, it having been proposed some time ago to drill a rather large hole or holes through the central regions of a body of quartz crystal so that electric fields could be utilized in different directions within the same crystal by applying or deriving potential differences between an electrode or electrodes within the hole or holes and electrode-bearing external surfaces. In this quartz crystal device an electrode was provided within the hole by inserting therein a helical-shaped wire so that the outer surfaces of the helix engaged the cylindrical walls of the hole.

With the development of suspensions of very finely divided conductive particles such as graphite, silver, or gold a great advance in electrode formation on piezoelectric crystals was made by applying such a suspension on a crystal surface, as by brushing or spraying, to form an electrode on that surface upon evaporation of the liquid suspending medium. Such a method of making electroded piezoelectric devices is disclosed and claimed in Patent No. 2,106,143 to A. L. W. Williams, assigned to the same assignee as the present invention. Patent No. 2,373,445 to H. G. Baerwald, also assigned to the same assignee, deals with transducer devices made up of two plate-like sections of piezoelectric crystal material disposed in spaced face-to-face relationship. These two sections may be separate plates held in the desired spaced relationship by brackets at the ends of the plates, or the central portions of a single crystal piece may be milled out to form a wide central slot so that the two plate-like portions of the resulting hollow body are joined together, but only at opposite ends thereof, by unmilled end portions of the piece of crystal. In either case electrodes are applied to the outer and inner surfaces of the plate-like portions by spraying a suspension of colloidal conductive materials thereupon, although some difficulty was said to be experienced in applying electrodes to the milled-out inner surfaces of a hollow body. In Patent No. 2,614,143 to A. L. W. Williams, also assigned to the same assignee, there are disclosed and claimed transducers in the shape of long, hollow bodies which may take the form of thin-walled tubular ceramic bodies of circular or oval cross-sectional shape. A conductive material, consisting of very small carbonaceous particles and a suitable binder, is applied to internal and external surfaces to form electrodes; such application to the interior surfaces may be made by pouring or forcing a liquid suspension of the conductive particles into the tube. However, as to the interior surfaces difficulties in carrying out such a procedure arise if the holes are rather narrow and quite long. Oval or flattened tubes were made by dipping strips cut from highly calendered thick paper cards in a slurry or slip of raw ceramic transducer material, followed by ceramic-firing. It was found necessary to apply suction at one end of the flat tube to force the suspension through the tube, and there was a tendency for the dried electrode to fail to cover all of the internal surfaces.

Another difficulty which arises in the fabrication of transducer devices from such circular or oval ceramic tubes, for example, is the problem of handling the units before, during, and after application of electrodes. Even when hollow units of oval or substantially flattened shape are used, so that the elements are generally flat and thin, the rounded edges that usually are found and the small sizes frequently encountered have in the past made the necessary fabrication and conditioning operations painstaking and expensive even though methods are devised for producing the unelectroded dielectric units in quantity at reasonable expense. The several fabrication operations, especially when performed upon elongated units whose length dimensions may be less than an inch and whose other dimensions may be of the order of a tenth of an inch, may prove quite difficult and expensive if each unit is handled individually in the usual manner. This may make prohibitive the cost of an otherwise very desirable capacitor or transducer unit.

Accordingly, it is an object of the invention to provide a new and improved method of fabricating a dielectric element which avoids one or more of the limitations or disadvantages of the previously known methods.

It is another object of the invention to provide a new and improved method of fabricating a dielectric element, suitable for use as a capacitor element or electromechanical transducer element, having very small or narrow internal holes which must be provided with electrodes.

It is a further object of the invention to provide a new and improved method of fabricating a plurality of rather small dielectric elements which substantially avoids the awkward and time-consuming nature of some of the electroding, conditioning, and other handling operations as previously carried out.

In accordance with an important feature of the invention, the method of fabricating a dielectric element comprises providing a dielectric body with at least one hole of capillary width having rough-textured internal walls and extending through the body from a surface thereof, placing this surface of the body in a pool of a liquid, capable of wetting the internal walls of each such hole and containing a material which is electrically conductive when in the form of a solid mass, to permit the liquid to enter each such hole by capillary action and flow along the internal walls, and drying the liquid in each such hole to form a conductive electrode of the aforesaid conductive material covering substantially all of the portions of the internal walls along which the liquid flowed.

In accordance with another feature of the invention, the method of fabricating a dielectric element, in the form of an electromechanical transducer element, comprises the provision of a body of electromechanically sensitive dielectric material similarly having at least one hole of capillary width with rough-textured internal walls and extending into the body from one surface thereof. This method involves furnishing electrode and terminal lead means to enable use of the body as a transducer element with translation of the electrical signal energy, involved in transducing between electrical and mechanical energy, over leads furnished in the aforementioned electrode and lead means; this furnishing of the electrode and lead means includes the formation of internal electrode portions by bringing the aforesaid one surface of the dielectric body into contact with a liquid suspension of conductive particles to permit the suspension to enter each hole by capillary action and coat the internal walls thereof, followed by drying the coated suspension to form the internal electrode portions within each such hole.

In accordance with a more extensive feature of the invention, the method of fabricating dielectric elements comprises placing a plurality of generally flat, thin dielectric bodies, each of which likewise has at least one hole of capillary width having rough-textured internal walls and extending generally lengthwise into the body from an end thereof, in a support so that the bodies are aligned in a row with spaced edge-to-edge relationship. The method further comprises applying electrically conductive electrode-forming particles in a cementitious medium to at least one side of each of the bodies in the row, leaving an unelectroded margin near the aforesaid end of each body, and affixing along the row of bodies a conductive strip fastened in electrical contact with the aforementioned electrode particles on one side of each body. The resulting unitary row of bodies, strung together in relative positions determined by the conductive strip, is brought into contact with a liquid suspension of conductive particles so that only the unelectroded end of each such body is in contact with the suspension to coat the interior walls of the holes with the last-mentioned conductive particles by capillary action. The internal coats then are dried, thus procuring from the dielectric bodies, originally provided, corresponding dielectric elements with conductive electrodes formed on the internal walls thereof.

This more extensive feature of the invention is adaptable by the use of additional method steps for fabricating dielectric elements in the form of transducer elements of electromechanically sensitive dielectric material capable of retaining remanent electrostatic polarization. In such a case the generally flat, thin bodies having the capillary holes are of the aforementioned electromechanically sensitive dielectric material, preferably a titanate-type ceramic material. After the internal walls of these holes are coated, as above, by capillary action and the internal coats then are permitted to dry, the additional steps comprise placing the unitary row of bodies against a yieldable conducting means, with only the end of each body having the unelectroded side margins in contact with this conducting means, to effect electrical contact with the internal electrode coats but not with the electrodes formed on the sides of the bodies, and then applying a unidirectional electric polarizing potential between the conductive strip and the yieldable conducting means for a predetermined period of time to polarize the bodies in directions generally between the internal holes and the electroded sides, whereby each of the bodies acquires the electromechanical response characteristic of a linear transducer element.

For a better understanding of the present invention, together with other and further objects thereof, reference is had to the following description taken in connection with the accompanying drawings, and its scope will be pointed out in the appended claims.

In the drawings, Fig. 1 is a perspective view of a dielectric body prior to fabrication therefrom, in accordance with the method of the invention, of a capacitor or transducer element complete with electrodes.

Figures 1, 2, 3:
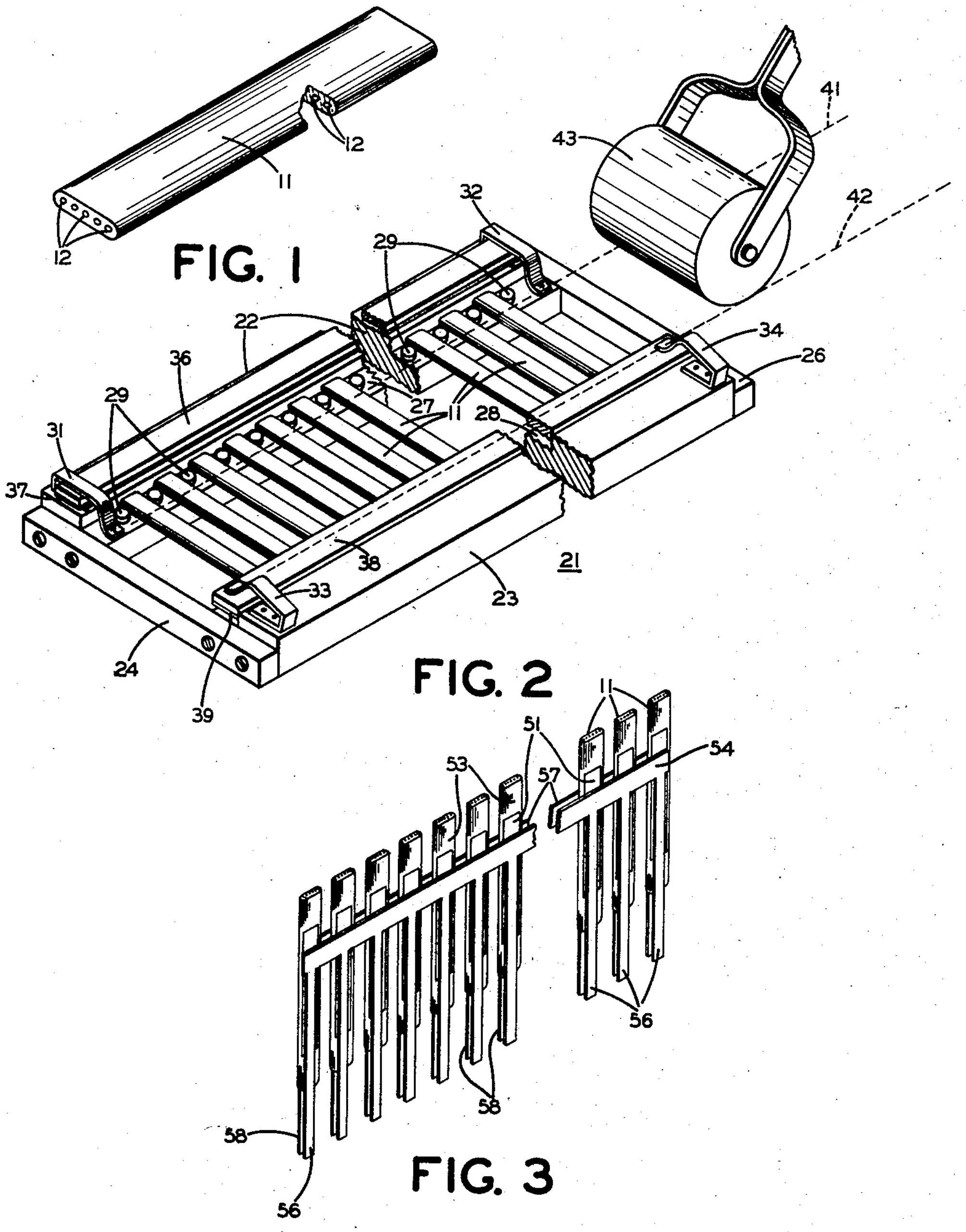
Fig. 2 is a perspective view of a plurality of bodies of the type illustrated in Fig. 1 placed in an arrangement for holding the bodies and subjecting them to an initial fabrication operation.
Fig. 3 is a perspective view of a row of the bodies after completion of the fabrication steps carried out in the holder shown in Fig. 2.

Referring now to Fig. 1, there is illustrated in perspective view a dielectric body 11 which is provided for use in the method of the invention. The body 11 is a generally flat, thin body with at least one hole of capillary width having rough-textured internal walls and extending into the body from an end surface thereof. More specifically, the body 11 has several such holes 12 extending generally lengthwise therein from one end surface through the body to the other. A portion of the body 11 is cut away in the view of Fig. 1 to show that the holes 12 extend parallel to each other throughout the length of the body.

If the holes are produced by a machining operation, such as drilling through a body of a common dielectric material, the required rough texture ordinarily is provided by the tool marks and minute fractures which are present unless a fine-grinding or lapping operation is resorted to. If the holes are produced initially in a ceramic-forming operation of the hydraulic extrusion type, smooth rather than rough-textured walls ordinarily result, both in the green state and in the fired bodies. Some different methods of producing ceramic bodies by forming coats from a slip on an unrefractory form are disclosed and claimed in my Patent No. 2,554,327 and in my application for Letters Patent Serial No. 343,055, filed concurrently herewith, both being assigned to the same assignee as the present invention. The last-mentioned application discloses and claims a method of producing a ceramic body having internal openings by deposition of a green ceramic coating on a supporting means or form having an aperture. Such a support may be a plurality of threads spaced somewhat apart laterally to leave apertures between the threads, and such a group of threads may be used to produce, after firing, the ceramic body 11 of Fig. 1. If the threads used are smooth-surfaced single filaments, or if a very highly calendered paper form is used as a support for deposition of the raw ceramic material, the surfaces of the resulting fired body ordinarily will be smooth textured. If, however, the paper form is not calendered and glossy, or if the thread-like form utilizes twists including filaments spun from staple fiber, the internal walls of the resulting ceramic body will have the required rough texture.

For most purposes, the dielectric body, for example the body 11, provided for use in the method of invention preferably is formed of a dielectric material having a high permittivity or dielectric constant. Such a property is advantageous when the dielectric body is to be used in fabricating a capacitor element or an electromechanical transducer element, although dielectric elements of relatively low permittivity also may be useful. For transducer use a body of electromechanically sensitive material is required. Such a material may be single-crystalline, for example of quartz, Rochelle salt, or ammonium dihydrogen phosphate, or it may be polycrystalline and preferably a ceramic dielectric body. An electromechanically sensitive material, as used in this specification and in the appended claims, is a material which, in the form of a compact mass or body, responds to the application of electric potentials thereacross, or to the corresponding electrostatic fields therein, by developing a substantial mechanical deformation. In the case of ceramic materials, to enable such a body to develop electrc fields upon the application of mechanical forces thereto it is necessary to condition the material. This usually is accomplished by applying a unidirectional potential across the ceramic body. When so conditioned or polarized, the mechanical response of the material to electric fields, as well as its electrical response to mechanical forces, becomes linear.

The titantate-type dielectric materials are particularly advantageous for this purpose; when these materials in ceramic form are polarized, they exhibit in general linear electromechanical responses of high magnitudes. The most common example of titanate-type materials is barium titanate. In the form of a compact ceramic body, barium titanate below its transformation temperature or Curie point of about 120° C. exhibits the high electromechancal response characteristic of a sensitive linear transducer element, provided it is first polarized. This particular titanate-type material in ceramic form also is capable of retaining remanent electrostatic polarization after the maintenance of a high polarizing potential across the ceramic body for a period of time such as 10 or 15 minutes. In this case the high, linear, reversible electromechanical sensitivity is retained in large measure for an indefinite period of time unless the body is subjected to very high electric fields in the reverse polarity or unless it reaches temperatures in the neighborhood of or greater than its transformation temperature.

Figure 4:
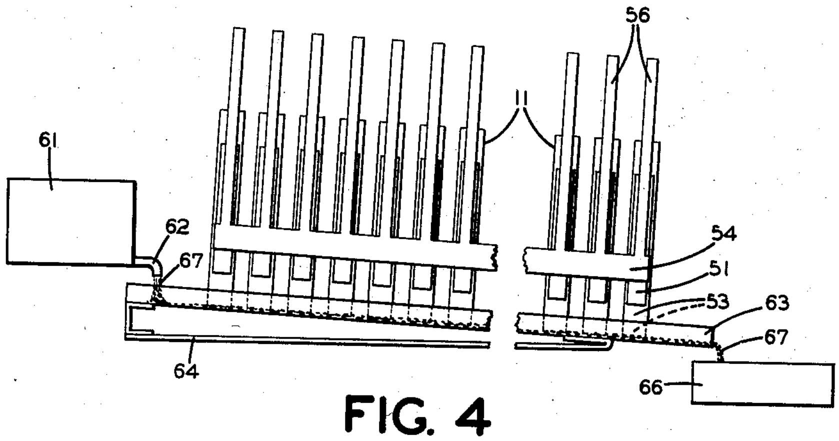
Fig. 4 is a view in side elevation showing the performance of a further fabricating operation to which the row of bodies illustrated in Fig. 3 is subjected.
Figure 5:
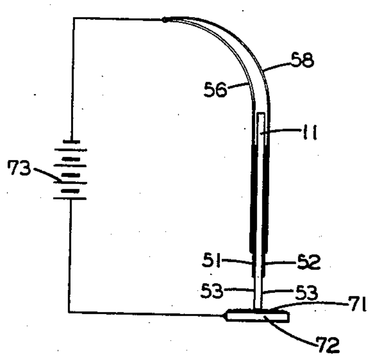
Fig. 5 represents in end elevation the same row of bodies being subjected to a final fabricating or conditioning operation.

Referring now to Fig. 2, this figure is a perspective view of an apparatus useful in carrying out the method of fabricating a dielectric element, which may be suitable for use as an electromechanical transducer element, in accordance with the invention. The apparatus shown in Fig. 2 is useful in carrying out the initial steps of a particularly advantageous method of fabricating a large number of such dielectric elements handled in one group; when the additional apparatus and procedures illustrated not only in Fig. 4 but also in Fig. 5 are used, as will be described hereinbelow, the method is of great utility in fabricating polarized transducer elements of electromechanically sensitive dielectric material capable of retaining remanent electrostatic polarization.

Describing first the apparatus of Fig. 2, as it would appear before placement of dielectric bodies therein for the initial fabrication steps, this apparatus includes a support or holder 21. Main support members 22 and 23 are shown in laterally spaced relationship, spaced at their ends by end members 24 and 26. Each of the main support members 22 and 23 has a depressed horizontal supporting surface 27 and 28 respectively, the two supporting surfaces being adjacent to the central part of the apparatus. Each supporting surface is equipped with a large number of spacing studs 29, leaving a clear supporting space between each pair of adjacent studs slightly greater than the over-all width dimension of a dielectric body such as the body 11. At each end of each support member 22 and 23 there are spring clips 31, 32, 33, and 34. These spring clips are bent back above the horizontal surface of the support members over the outer part of the apparatus, and at their inner ends they have depressed end portions which are urged downward by the spring action toward the depressed supporting surface 27 or 28. A retaining bar 36, having a resilient lower surface 37 of a material such as felt or rubber, is shown resting loosely under the outward or raised portions of the spring clips 31 and 32 over the support member 22. A similar retaining bar 38 with a similar resilient lower surface 39 is shown over the support member 23 but in a different position, as will be explained hereinbelow.

For carrying out the initial fabrication steps, a plurality of generally flat, thin dielectric bodies, each of which may be the same as the body 11, are placed in the holder 21 so that the bodies are aligned in a row with spaced edge-to-edge relationship. Each body 11 is placed with the flat surface at one end of the body in the space between two adjacent spacing studs 29 on one of the supporting surfaces 27 and with the same flat surface at the other end of the body between a pair of the studs 29 on the supporting surface 28 directly across from the aforementioned pair of studs on the surface 27. In this way as many as 50 or more of the bodies may be placed in the holder 21 with the bodies parallel to each other and with the sides of each body spaced from the sides of the adjacent bodies by a distance determined by the spacing and width of the studs 29.

The retaining bar 36 now is moved toward the central part of the apparatus so that the ends of the bar are urged downwardly by the depressed ends of the spring clips 31 and 32. The bar 38 on the opposite side of the holder is shown in the corresponding position under the ends of the clips 33 and 34. The resilient surfaces 37 and 39 of the two bars then conform to a certain extent to the upper surfaces of the ends of the bodies 11, holding them firmly in spaced position between the studs 29. For convenience of discussion hereinbelow a pair of reference lines 41 and 42 has been drawn in Fig. 2 in the approximate plane containing the upper surfaces of the bodies 11 as arranged in the apparatus shown in Fig. 2. The reference line 41 passes across each body 11 in this plane a short distance toward the central part of the holder 21 from the position of the inner edge of the bar 36 when that bar is resting under the ends of the clips 31 and 32. The reference line 42 is seen to lie a short distance toward the central part of the apparatus from the inner edge of the bar 38.

The next step in the fabrication of the dielectric elements involves applying electrically conductive electrode-forming particles in a cementitious medium to at least one side of each of the plurality of bodies 11 aligned in a row in the support 21. This may be accomplished with use of a roller 43 having a soft, resilient, rubbery roller surface and a handle arranged for motion of the roller either manually or by automatic mechanisms. The roller has a width equal to the separation of the parallel reference lines 41 and 42 in Fig. 2. A paste or slurry is used of the conductive electrode-forming particles, which may be, for example, comminuted graphite or silver particles. Graphite particles may be used in an aqueous medium; after evaporation on a coated surface these particles tend to cling to each other, but the aqueous medium should be given cementitious properties by including therein a small quantity of a binder such a lignosulfonate to give added strength to a dried layer of the graphite particles. Silver particles may be contained in a volative organic liquid including cementitious matter such as ethylcellulose. A pool of this paste or slurry is formed on a suitable surface, not shown, and the roller 43 is passed over that surface to pick up a covering of the paste or slurry. The resilient surface of the roller then is moved along the apparatus illustrated in Fig. 2 between the reference lines 41 and 42 to contact the generally flat upper surface of each of the bodies. In this way the electrode-forming particles are applied to those surfaces by transfer from the roller surface covered therewith. Upon drying, with or without heating, the material in the paste or slurry forms an adherent electrode on the surfaces covered by the roller. Commonly used materials may be employed in this operation, and methods of this type for making electrodes are disclosed and claimed in the aforementioned Williams Patent No. 2,106,143. It will be understood that the resulting electrodes will extend laterally on each body 11 over the essentially flat upper surface thereof and to some extent on to the rounded portions near the edges of the bodies, the exact lateral extent being determined by the resiliency of the roller surface, the pressure of application of the roller, the curvature of the lateral edge portions of the body 11, and any slight tendency of the electrode-forming material to flow upon application to the bodies 11.

A conductive strip next is affixed along the row of bodies 11 in the holder 21, this strip being fastened in electrical contact with the electrode particles, applied as just described, on one side of each body 11. The row of bodies having the relative positions which they occupy in the apparatus of Fig. 2 is shown after removal from this apparatus in the perspective view of Fig. 3, the bodies being shown in vertical positions for convenience of illustration. The electrodes formed in the Fig. 2 apparatus from the aforementioned electrode-forming particles on the upper surface of each body 11 are represented at 51 in the view of Fig. 3. It will be understood that a similar set of electrodes 52 may be formed on the reverse flat surfaces of each of the bodies 11; these electrodes are not visible in the view of Fig. 3. They may be applied similarly with the roller 43 by moving the roller along the lower surfaces of the bodies 11 while still supported in the holder 21, or they may be applied to the row of bodies 11 as shown in Fig. 3 after the conductive strip 54 has been affixed to the electrodes 53 along the entire row and the row removed from the holder. The electrodes 52 may have the same shape as the electrodes 51 and may be placed symmetrically with respect thereto. It will be noted that the application of the roller 43 to form the electrodes 51 leaves an unelectroded margin 53 near one end of each body 11, specifically the upper end as the bodies appear in Fig. 3. Similar margins are left at the same end of each body 11 when the electrodes 52 are applied on the opposed faces of the flat bodies. Thus it is preferred to apply the electrically conductive particles to both of the generally flat sides of each body 11 to form the outer electrodes 51 and 52 on each body, leaving an unelectroded margin 53 on both sides of each body near one end thereof.

The above-mentioned conductive strip affixed along the row of bodies is shown in Fig. 3 as a thin structure, which may conveniently be of copper or silver foil, having an elongated or strip-like portion 54. It may be applied over the electrodes 51 with the use of a cement loaded with conductive particles so as to insure electrical contact between the strip 54 and each electrode 51. In proper cases the strip 54 may be affixed to the electrodes 51 by the cementitious substance included in the material applied by the roller 43. In any case the strip 54 conveniently is applied to all of the elements 11 while they are held in position in the holder 21, thus combining all of the bodies 11 into a unitary row of bodies in a manner most convenient for the subsequent fabrication operations.

It is preferred to utilize the structure 54 to provide electrical contact leads for each of the electrodes 51. This may be done by including in the metal foil structure, having the strip-like portion 54 fastened to the electrodes 51 individually, a plurality of furcated terminal lead portions 56 extending individually from the regions of the strip-like portion 54 individually adjacent to each body 11. These leads 56 pass lengthwise adjacent to the respective bodies 11 and extend beyond the ends thereof. A similar tie strip 57 may be affixed across the opposed electrodes 52 and provided with similar individual furcated lead extensions 58 for the bodies 11. This elongated strip 57 is applied, of course, after the opposed electrodes 52 are applied, and this may be done before or after the row of bodies is removed from the holder 21. The individual strip and lead structures 54, 56 and 57, 58, affixed along the row of bodies on each side thereof in contact with the outer electrodes 51 and 52 on the respective sides of each body 11, may be punched from a single sheet of foil. It will be understood that, at the conclusion of the various fabrication operations for which it is convenient to hold the bodies together, electrically connected in a unitary row, the strips 54 and 57 may be severed between the bodies so that each body 11 has its individual outer electrodes 51 and 52 with corresponding individual leads 56 and 58 respectively.

When the method of the present invention is employed to fabricate an electromechanical transducer element from a body such as the body 11, the method comprises furnishing electrode means, and preferably electrode and terminal lead means, to enable use of the body as a transducer element with translation of the electrical signal energy, involved in transducing between electrical and mechanical energy, over leads furnished in the electrode and lead means. The electrode and lead means furnished for the transducer element may include the electrode 51 and its terminal lead 56 on one side of each body 11, and also may include the electrode 52 and its lead 58 on the other side. However, an important step in the fabrication of each dielectric element in accordance with the invention is the formation of internal electrodes within the holes 12 in the elements 11. Thus, in the case of the transducer elements, the furnishing of the electrode and lead means for such elements includes the formation of the internal electrode portions within the holes.

The formation of the internal electrode portions is carried out by bringing the end surface of a body 11, from which the holes 12 extend into the body and which is isolated from the outer electrodes 51 and 52 by the margins 53, into contact with a liquid which serves to supply electrode-forming material to the internal walls of the holes. Accordingly, this operation is carried out by placing the end surface of the body 11 in a pool of a suitable liquid. The surface of the body 11 which is placed in the liquid is seen at the nearer end of the body in Fig. 1 and, along with numerous similar bodies, at the upper end of each body as shown in Fig. 3. Referring to Fig. 4, the same group of bodies, made into a unitary row in the apparatus of Fig. 2 and illustrated in vertical positions in Fig. 3, is shown also with the bodies in practically vertical positions, but turned end for end with the ends having the margins 53 lowermost. These lower ends as shown in Fig. 4 are free of the leads 56 and 58.

The apparatus of Fig. 4 includes a storage tank 61 having a small outlet 62. Usually it will be convenient to provide mixing or stirring means, not shown, within the tank 61. The outlet 62 is disposed above the higher end surface of a slightly inclined trough 63, which is maintained at the desired inclination by a base structure 64. The other, somewhat lower, end of the trough 63 is placed above another tank 66, and an arrangement, not shown, may be provided for recirculating liquid from the tank 66 back to the storage tank 61.

The tank 61 is filled with a liquid which is capable of wetting the internal walls of each hole 12 in the bodies 11 and which contains a material which is electrically conductive when in the form of a solid mass. A suitable liquid for this purpose may be, for example, a solution of a precious metal compound in a volatile organic solvent; solutions of this type commonly are used for decorating the external surface of chinaware, pottery ware, and glassware. After application to ware of these types and firing in a suitable furnace, the coating of the solution dries by evaporation and decomposition, leaving a closely adherent film of the precious metal which is electrically conductive in this solid form. However, the invention will be described as employing a liquid, preferred for this purpose, which also is capable of wetting the internal walls but which contain in suspension a finely divided, electrically conductive solid material. An aqueous liquid suspension of finely divided carbonaceous particles is especially desirable for use as the liquid suspension of conductive particles, and graphite in the shape of particles having colloidal or near-colloidal dimensions is recommended.

The storage tank 61 in the apparatus of Fig. 4 contains this liquid suspension. When the graphite is of greater than colloidal size the liquid suspension should be stirred before use. This liquid, designated 67 in Fig. 4, runs from the outlet 62 onto the inclined trough 63, and then flows slowly down the inclination as a shallow stream or pool and drops into the tank 66. The end surface of each of the bodies 11 rests lightly on or just above the surface of the trough 63, so that this surface is brought into contact with the liquid suspension of conductive particles flowing along the trough. This permits the liquid suspension 67 to enter each hole 12 by capillary action and flow along the internal walls of the hole, preferably along the entire length thereof, to coat these walls and fill the hole. When a unitary row of bodies, strung together in relative positions determined by the conductive strip 54 with or without the other conductive strip 57 or other adhesive ties between the bodies, is brought into contact with the liquid suspension of conductive particles so that only the unelectroded end of each body, having the margins 53, is in contact with the suspension 67, the internal walls of the holes in every body are coated with the conductive particles by capillary action.

The row of bodies then is removed from the Fig. 4 apparatus and the internal coats permitted to dry. When the nautre of the material of the dielectric bodies permits heating, the drying can be accelerated, and with ceramic bodies in particular the internal coats may be dried by baking the body. Drying the liquid in each hole, accordingly, forms from the liquid a conductive electrode of the conductive material which covers substantially all of the portions of the internal walls along which the liquid flowed. Since the liquid ordinarily fills the holes, the resulting electrode ordinarily covers substantially all portions of the internal walls. When the liquid used contains solid particles in suspension, drying the coated suspension forms electrode portions of this solid material within each hole on substantially all portions of the internal walls reached by the suspension. Drying a coated carbonaceous suspension thus provides electrode portions formed of a conductive coating of the carbonaceous particles, preferably in the form of a graphite electrode within each hole 12. Since the bodies 11 by this procedure are given a complete set of outer and internal electrodes, drying the internal coats may be said to procure from the row of dielectric bodies a corresponding set of structurally complete dielectric elements with the conductive electrodes formed on the internal walls thereof.

Several precautions should be observed if satisfactory internal electrodes are to be obtained without the necessity of excessive care in filling the holes with the electrode material and drying the material. In the first place, it will be appreciated that the holes cannot be filled efficiently by capillary action if they are obstructed seriously by foreign materials. For example, if the dielectric body is formed by coagulating a ceramic raw material on a length of thread or paper, followed by ceramic-firing, the thread or paper should be chosen to have a low ash content, and a material, such as nylon, should be used for the form which minimizes sticking to the ceramic during drying and firing of the ceramic with resulting ceramic fragments inside the holes; production of tubular elements can be hampered badly by the presence of excessive ash and fragmentary ceramic remnants within the tubes after firing, and mechanical removal of such remnants is difficult.

Particular attention also should be paid to the texture of the internal surfaces. Glassy surfaces, glazed ceramic surfaces, and extruded ceramic shapes having very smooth walls present particular difficulties, both in obtaining the desired liquid coating and in drying the coating to form the electrode. Even the use of a form made of glossy paper in preparing the ceramic body by deposition of green ceramic particles on the form seriously impedes or prevents the formation of a suitable internal electrode in the fired body. With such smooth surfaces the liquid coating tends to pull away from the portions of the internal surfaces which are the first to dry. This difficulty probably stems from the relatively low viscosity of the coated liquid suspension at the beginning of the drying operation. Without limiting the invention in any way by theoretical considerations, it may be suggested that, although at least a minimal capillary action is necessary for the practical introduction of the electrode-forming material to the interior surfaces, considerably greater inter-surface forces may be required during drying, and the rough texture of the internal walls probably functions effectively to increase the local forces of surface attraction, thus retaining an adequate coating of the liquid on all the surface portions within the holes while the liquid dries from the ends of the holes inward. It will be realized in any case that the liquid electrode-forming material should be capable of a definite wetting action on the internal walls of the hole if adequate filling of such holes of capillary width is to be obtained. The internal walls thus should be free of wax, grease, or any other material which might prevent the wetting action. On occasion it may be necessary to include a detergent or wetting agent in the liquid to promote the wetting and hence the capillary action.

When proper precautions are observed the holes may be filled with electrode-forming liquid with remarkable ease. Holes of capillary width may be filled in this way even though the holes are considerably greater than capillary size in the other lateral dimension, that is, generally rectangular in shape with only one of the sides of the rectangle of capillary size. A clean ceramic tubular body having a generally circular hole 0.008 inch in diameter and one inch long may be filled in from one to three seconds using an aqueous liquid suspension. When one end of the narrow hole is placed in a pool of the electrode-forming liquid or against a piece of felt saturated with the liquid, the liquid column is observed to leap into view at the other end of the tube within one or two seconds from the time of contact. If a tube of these dimensions should take longer than three seconds to fill, improper surface conditions or wetting action is indicated with a tendency toward erratic electrode coverage of the internal surfaces. When the electrode formation proceeds properly, however, substantially all portions of the internal walls along which the liquid flowed by capillary action will retain the conductive covering after drying, and, moreover, the liquid will reach and coat all the internal wall portions.

The choice of a suitable electrode-forming liquid greatly facilitates the formation of the internal electrodes. For most dielectric elements a preferred liquid is an aqueous suspension of graphite particles in a state of near-colloidal subdivision. Such dispersions are obtainable commercially in a substantial range of solid particle sizes and of proportions of solid to liquid, and these preparations ordinarily contain small amounts of a cementitious material to increase the strength of the dry coating. The finely divided graphite advantageously may constitute about 10% by weight of the graphite-water dispersion. It has been found highly desirable to include, in solution in the aqueous dispersing medium, a small amount of a dispersing agent. A preferred dispersing agent is a tannic acid, and such a tannin, for example digallic acid, or a mixture of tannins is efficacious as the dispersing agent. The naturally occurring gallotannin, or gallotannic acid, is particularly recommended. Thus the dispersing agent may comprise one or more such galloylated glucoses, a specific example being pentadigalloyl ester of glucose. Accordingly, the suspension of carbonaceous or graphite particles may contain in solution a tannic acid as a dispersing agent in a substantial amount by weight of less than one percent of the weight of the solvent water. Preferably gallotannic acid is present as the dispersing agent in an amount by weight of between about 0.05 and 0.5 percent of the weight of the solvent water. Quantities of the tannin below this range have inconsiderable dispersing action, while quantities very much in excess of this range tend to provide a dried deposit which is a relatively poor electrical conductor unless the excess organic material is carbonized by a special heating operation.

Permanent leads may be provided from the internal electrodes, if desired, so that the body 11 may be used as a dielectric capacitor or transducer element with one electrical terminal connected to the internal electrodes and the other terminal connected to one or both outer electrodes 51 and 52. The electrode portions within each hole 12 are interconnected by the electrode-forming layer which remains over the entire end of the element 11 when the ends of the holes 12 are placed in contact with the electrode-forming liquid. Permanent lead wires or strips, not shown, may be fastened to the conductive material in this end of the body 11.

However, in a preferred method in accordance with the invention there is fabricated an electromechanical transducer element of material capable of retaining remanent electrostatic polarization, to which only temporary connections need be made to the internal electrodes during the polarizing operation. There is represented in Fig. 5 an apparatus of economical construction suitable for effecting the necessary preliminary polarization. The unitary row of bodies 11, after removal from the apparatus shown in Fig. 4 and drying of the internal electrode material, is placed against a yieldable conducting means 71 with only the end of each body 11 having the margins 53 in contact with the conducting means. As illustrated in Fig. 5, the yieldable conducting means 71 is a shallow pool of liquid mercury in which the lower ends of the bodies are placed. Even though the excess electrode material on the end surfaces of the bodies 11 may have been removed by wiping or grinding during or after formation of the internal electrodes, the mercury in the apparatus of Fig. 5 comes in contact with the lower end of the internal electrode within each of the holes 12. The pool or film of mercury 71 simply rests on a flat bar 72, against which the lower ends of the bodies 11 are pressed to effect electrical contact of the mercury with the internal electrode coats in the holes 12. However, due to the separation afforded by the margins 53, contact is not made with the outer electrodes 51 and 52 formed on the sides of the bodies 11. The end view of Fig. 5 shows both outer electrodes.

A unidirectional electric polarizing potential then is applied between each of the conductive structures or strips 54 and 57, connected in parallel, and the yieldable conducting means provided by the mercury 71. In Fig. 5 it will be seen that the electrical connection to the conductive strips is made by bringing the terminal leads 56 and 58 into contact with each other. Only one pair of these leads need be used for this purpose, since all of the other leads and consequently all of the electrodes 51 and 52 also are interconnected through the strips 54 and 57 extending along the entire row of bodies 11. The interconnected conductor strips are connected to one terminal of a source of polarizing potential in the form of a high-voltage battery 73. The other terminal of the battery 73 is connected to the bar 72, thus providing a conductive connection through the mercury 71 to all of the internal electrodes. This polarizing connection is maintained for a predetermined period of time to polarize the titanate-type ceramic material of the bodies 11 in directions generally between the internal holes and the electroded sides, whereby each of the ceramic bodies acquires the electromechanically responsive characteristic of a linear transducer element.

As seen in the view of Fig. 3, it will be observed that this polarizing field is directed between the walls of each hole 12 within a body 11 and the outer electrode 51. In the regions lying directly between an internal hole and the electrode 51 the direction of the polarizing field obviously is in the desired thickness direction. When the holes 12 are fairly closely spaced in each element 11, the polarizing field will be aligned in this general thickness direction throughout practically all of the width of the body 11. With the inclusion of the opposed electrode 52 in the polarizing connection shown in Fig. 5, a similar thickness-directed polarization is provided in the other side of each element. The polarization may be carried out in the Fig. 5 apparatus, if desired, at elevated temperatures in the neighborhood of the transformation temperature of the electromechanically sensitive ceramic dielectric material to insure high remanent polarization. After the bodies have cooled, the row of finished transducer elements is disconnected from the battery 73 and removed from the Fig. 5 apparatus, whereupon the strips 54 and 57 may be severed between each body to provide the individual transducer elements.

With the remanent polarization in opposite thickness directions in the two thickness portions of the body, as obtained with the polarizing connection shown in Fig. 5, these transducer elements provide a very useful electromechanical response in a bending mode of motion. Elements of this type are described and claimed, and the nature of the transducing response is discussed, in my concurrently filed application for Letters Patent Serial No. 343,054, assigned to the same assignee as the present invention. It may be noted that in the operation of these bender transducer elements the only electrical signal connections necessary are to the outer electrodes, so that only the signal leads 56 and 58 are needed for the terminal lead connections. The connection to the internal electrodes may be omitted in this case without eliminating the bending response because the electric signal fields, although they appear in the same thickness direction throughout the body between the outer electrodes 51 and 52, are at any given instant in the same direction as the polarization direction on one side of the row of holes 12 but in the opposite direction from the polarization direction on the other side of the holes. In other words, the temporary application of the polarizing potential in one direction on one side of the holes, that is from the outer electrode 51 to the internal electrodes, and in the reverse direction on the other side of the holes, that is from the other outer electrode 52 back to the internal electrodes, eliminates the necessity of a lead connection to the internal electrodes during operation as a transducer device. Accordingly, when the bodies 11 are furnished with internal electrodes for polarization and with the outer electrodes 51 and 52, the only terminal lead means necessary for translation of the electrical signal energy during use as a transducer element is provided by the leads 56 and 58 connected to the respective outer electrodes 51 and 52.

While there have been described what at present are considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. The method of fabricating a dielectric element, comprising: providing a dielectric body with at least one hole of capillary width having rough-textured internal walls and extending through said body from a surface thereof; placing said surface of said body in a pool of a liquid, capable of wetting said internal walls of each said hole and containing a material which is electrically conductive when in the form of a solid mass, to permit said liquid to enter each said hole by capillary action and flow along said internal walls; and drying said liquid in each said hole to form a conductive electrode of said conductive material covering substantially all of the portions of said internal walls along which said liquid flowed.

2. The method of fabricating a dielectric element, comprising: providing a dielectric body with at least one hole of capillary width having rough-textured internal walls and extending through said body from a surface thereof; placing said surface of said body in a pool of a liquid, capable of wetting said internal walls of each said hole and containing in suspension a finely divided, electrically conductive solid material, to permit said liquid suspension to enter each said hole by capillary action and flow along said internal walls; and drying said liquid in each said hole to form a conductive electrode of said solid material covering substantially all of the portions of said internal walls along which said liquid suspension flowed.

3. The method of fabricating a dielectric element, comprising: providing a ceramic dielectric body with at least one hole of capillary width having rough-textured internal walls and extending through said body from a surface thereof; placing said surface of said body in a pool of an aqueous liquid suspension of finely divided carbonaceous particles to permit said suspension to enter each said hole by capillary action and flow along the entire length of said internal walls; and baking said body to dry said suspension in each said hole and form a conductive electrode of said carbonaceous particles covering all portions of said internal walls.

4. The method of fabricating a dielectric element, comprising: providing a ceramic dielectric body with at least one hole of capillary width having rough-textured internal walls and extending through said body from a surface thereof; placing said surface of said body in a pool of an aqueous liquid suspension of finely divided carbonaceous particles, containing in solution a small amount of a dispersing agent, to permit said suspension to enter each said hole by capillary action and flow along the entire length of said internal walls; and baking said body to dry said suspension in each said hole and form a conductive electrode of said carbonaceous particles covering all portions of said internal walls.

5. The method of fabricating a dielectric element, comprising: providing a ceramic dielectric body with at least one hole of capillary width having rough-textured internal walls and extending through said body from a surface thereof; placing said surface of said body in a pool of an aqueous liquid suspension of finely divided carbonaceous particles, containing in solution a small amount of a tannic acid as a dispersing agent, to permit said suspension to enter each said hole by capillary action and flow along the entire length of said internal walls; and baking said body to dry said suspension in each said hole and form a conductive electrode of said carbonaceous particles covering all portions of said internal walls.

6. The method of fabricating a dielectric element, comprising: providing a ceramic dielectric body with at least one hole of capillary width having rough-textured internal walls and extending through said body from a surface thereof; placing said surface of said body in a pool of an aqueous liquid suspension of finely divided carbonaceous particles, containing in solution gallotannic acid as a dispersing agent in an amount by weight of between about 0.05 and 0.5 percent of the weight of the solvent water, to permit said suspension to enter each said hole by capillary action and flow along the entire length of said internal walls; and baking said body to dry said suspension in each said hole and form a conductive electrode of said carbonaceous particles covering all portions of said internal walls.

7. The method of fabricating a dielectric electromechanical transducer element, comprising: providing a body of electromechanically sensitive dielectric material with at least one hole of capillary width having rough-textured internal walls and extending into said body from one surface thereof; and furnishing electrode and terminal lead means to enable use of said body as a transducer element with translation of the electrical signal energy, involved in transducing between electrical and mechanical energy, over leads furnishd in said electrode and lead means, said furnishing of said electrode and lead means including the formation of internal electrode portions by bringing said one surface of said body into contact with a liquid suspension of conductive particles to permit said suspension to enter each said hole by capillary action and coat the internal walls thereof, and by drying said coated suspension to form said electrode portions within each said hole.

8. The method of fabricating a dielectric electromechanical transducer element, comprising: providing a body of electromechanically sensitive dielectric material with at least one hole of capillary width having rough-textured internal walls and extending into said body from one surface thereof; and furnishing electrode and terminal lead means to enable use of said body as a transducer element with translation of the electrical signal energy, involved in transducing between electrical and mechanical energy, over leads furnished in said electrode and lead means, said furnishing of said electrode and lead means including the formation of internal electrode portions by bringing said one surface of said body into contact with an aqueous liquid suspension of finely divided carbonaceous particles to permit said suspension to enter each said hole by capillary action and coat the internal walls thereof, and by drying said coated suspension to provide said electrode portions formed of a conductive coating of said carbonaceous particles within each said hole.

9. The method of fabricating a dielectric electromechanical transducer element, comprising: providing a body of electromechanically sensitive dielectric material with at least one hole of capillary width having rough-textured internal walls and extending into said body from one surface thereof; and furnishing electrode and terminal lead means to enable use of said body as a transducer element with translation of the electrical signal energy, involved in transducing between electrical and mechanical energy, over leads furnished in said electrode and lead means, said furnishing of said electrode and lead means including the formation of internal electrode portions by bringing said one surface of said body into contact with an aqueous liquid suspension of finely divided graphite to permit said suspension to enter each said hole by capillary action and coat the internal walls thereof, and by drying said coated suspension to provide said electrode portions in the form of a graphite electrode within each said hole.

10. The method of fabricating a dielectric electromechanical transducer element, comprising: providing a body of electromechanically sensitive dielectric ceramic material with at least one hole of capillary width having rough-textured internal walls and extending into said body from one surface thereof; and furnishing electrode and terminal lead means to enable use of said body as a transducer element with translation of the electrical signal energy, involved in transducing between electrical and mechanical energy, over leads furnished in said electrode and lead means, said furnishing of said electrode and lead means including the formation of internal electrode portions by bringing said one surface of said body into contact with an aqueous liquid suspension of finely divided graphite, containing in solution a tannic acid as a dispersing agent in a substantial amount by weight of less than one percent of the weight of the solvent water, to permit said suspension to enter each said hole by capillary action and coat the internal walls thereof, and by baking said body to dry said coated suspension and provide said electrode portions in the form of a graphite electrode within each said hole.

11. The method of fabricating dielectric elements, comprising: placing a plurality of generally flat, thin, dielectric bodies, each of which has at least one hole of capillary width having rough-textured internal walls and extending generally lengthwise into said body from an end thereof, in a support so that said bodies are aligned in a row with spaced edge-to-edge relationship; applying electrically conductive electrode-forming particles in a cementitious medium to at least one side of each of said bodies in said row, leaving an unelectroded margin near said end of each said body; affixing along said row of bodies a conductive strip fastened in electrical contact with said electrode particles on one side of each said body; bringing said unitary row of bodies, strung together in relative positions determined by said conductive strip, into contact with a liquid suspension of conductive particles so that only said unelectroded end of each said body is in contact with said suspension to coat said internal walls of said holes with said last-mentioned conductive particles by capillary action; and drying said internal coats to procure from said dielectric bodies corresponding dielectric elements with conductive electrodes formed on said internal walls thereof.

12. The method of fabricating dielectric elements, comprising: placing a plurality of generally flat, thin, dielectric bodies, each of which has at least one internal hole of capillary width having rough-textured internal walls and extending generally lengthwise into said body from an end thereof, in a support so that said bodies are aligned in a row with spaced edge-to-edge relationship; applying electrically conductive electrode-forming particles in a cementitious medium, by transfer from a roller having a resilient surface covered therewith, to at least one side of each of said bodies in said row, leaving an unelectroded margin near said end of each said body; affixing along said row of bodies a conductive strip fastened in electrical contact with said electrode particles on one side of each said body; bringing said unitary row of bodies, strung together in relative positions determined by said conductive strip, into contact with a liquid suspension of conductive particles so that only said unelectroded end of each said body is in contact with said suspension to coat said internal walls of said holes with said last-mentioned conductive particles by capillary action; and drying said internal coats to procure from said dielectric bodies corresponding dielectric elements with electrodes formed on said internal walls thereof.

13. The method of fabricating dielectric elements, comprising: placing a plurality of generally flat, thin, dielectric bodies, each of which has at least one hole of capillary width having rough-textured internal walls and extending generally lengthwise into said body from an end thereof, in a support so that said bodies are aligned in a row with spaced edge-to-edge relationship; applying electrically conductive electrode-forming particles in a cementitious medium to at least one side of each of said bodies in said row, leaving an unelectroded margin near said end of each said body; affixing along said row of bodies a conductive structure having a strip-like portion fastened in electrical contact with said electrode particles on one side of each said body individually and having a plurality of furcated terminal lead portions extending individually from the regions of said strip-like portion individually adjacent to each said body; bringing said unitary row of bodies, strung together in relative positions determined by said conductive structure, into contact with a liquid suspension of conductive particles so that only said unelectroded end of each said body is in contact with said suspension to coat said internal walls of said holes with said last-mentioned conductive particles by capillary action; and drying said internal coats to procure from said dielectric bodies corresponding dielectric elements with conductive electrodes formed on said internal walls thereof.

14. The method of fabricating dielectric elements, comprising: placing a plurality of generally flat, thin, dielectric bodies, each of which has at least one hole of capillary width having rough-textured internal walls and extending generally lengthwise into said body from an end thereof, in a support so that said bodies are aligned in a row with spaced edge-to-edge relationship; applying electrically conductive particles in a cementitious medium to both of the generally flat sides of each of said bodies in said row to form outer electrodes on each said body, leaving an unelectroded margin on both sides of each said body near said end thereof; affixing along said row of bodies on each side thereof an individual conductive strip fastened in electrical contact with said outer electrode on the respective side of each said body; bringing said unitary row of bodies, strung together in relative positions determined by said conductive strips, into contact with a liquid suspension of conductive particles so that only said unelectroded end of each said body is in contact with said suspension to coat said internal walls of said holes with said last-mentioned conductive particles by capillary action; and drying said internal coats to procure from said dielectric bodies corresponding dielectric elements with conductive electrodes formed on said internal walls thereof.

15. The method of fabricating transducer elements of electromechanically sensitive dielectric material capable of retaining remanent electrostatic polarization, comprising: placing a plurality of generally flat, thin bodies of said electromechanically sensitive dielectric material, each of which has at least one hole of capillary width having rough-textured internal walls and extending generally lengthwise into said body from an end thereof, in a support so that said bodies are aligned in a row with spaced edge-to-edge relationship; applying electrically conductive electrode-forming particles in a cementitious medium to at least one side of each of said bodies in said row, leaving an unelectroded margin near said end of each said body; affixing along said row of bodies a conductive strip fastened in electrical contact with said electrode particles on one side of each said body; bringing said unitary row of bodies, strung together in relative positions determined by said conductive strip, into contact with a liquid suspension of conductive particles so that only said unelectroded end of each said body is in contact with said suspension to coat said internal walls of said holes with said last-mentioned conductive particles by capillary action, said internal coats then being permitted to dry; placing said unitary row of bodies against a yieldable conducting means with only said last-mentioned end of each said body in contact with said conducting means to effect electrical contact with said internal electrode coats but not with said electrodes formed on said sides of said bodies; and applying a unidirectional electric polarizing potential between said conductive strip and said yieldable conducting means for a predetermined period of time to polarize said bodies in directions generally between said internal holes and said electroded sides, whereby each of said bodies acquires the electromechanical response characteristic of a linear transducer element.

16. The method of fabricating transducer elements of electromechanically sensitive dielectric material capable of retaining remanent electrostatic polarization, comprising: placing a plurality of generally flat, thin bodies of titanate-type ceramic material, each of which has at least one hole of capillary width having rough-textured internal walls and extending generally lengthwise into said body from an end thereof, in a support so that said bodies are aligned in a row with spaced edge-to-edge relationship; applying electrically conductive electrode-forming particles in a cementitious medium to at least one side of each of said bodies in said row, leaving an unelectroded margin near said end of each said body; affixing along said row of bodies a conductive strip fastened in electrical contact with said electrode particles on one side of each said body; bringing said unitary row of bodies, strung together in relative positions determined by said conductive strip, into contact with a liquid suspension of conductive particles so that only said unelectroded end of each said body is in contact with said suspension to coat said internal walls of said holes with said last-mentioned conductive particles by capillary action, said internal coats then being dried by baking; placing said unitary row of bodies against a yieldable conducting means with only said last-mentioned end of each said body in contact with said conducting means to effect electrical contact with said internal electrode coats but not with said electrodes formed on said sides of said bodies; and applying a unidirectional electric polarizing potential between said conductive strip and said yieldable conducting means for a predetermined period of time to polarize said titanate-type ceramic material of said bodies in directions generally between said internal holes and said electroded sides, whereby each of said bodies acquires the electromechanical response characteristic of a linear transducer element.

17. The method of fabricating transducer elements of electromechanically sensitive dielectric material capable of retaining remanent electrostatic polarization, comprising: placing a plurality of generally flat, thin bodies of said electromechanically sensitive dielectric material, each of which has at least one hole of capillary width having rough-textured internal walls and extending generally lengthwise into said body from an end thereof, in a support so that said bodies are aligned in a row with spaced edge-to-edge relationship; applying electrically conductive electrode-forming particles in a cementitious medium to at least one side of each of said bodies in said row, leaving an unelectroded margin near said end of each said body; affixing along said row of bodies a conductive strip fastened in electrical contact with said electrode particles on one side of each said body; bringing said unitary row of bodies, strung together in relative positions determined by said conductive strip, into contact with a liquid suspension of conductive particles so that only said unelectroded end of each said body is in contact with said suspension to coat said internal walls of said holes with said last-mentioned conductive particles by capillary action, said internal coats then being permitted to dry; placing said unitary row of bodies in a shallow pool of liquid mercury with only said last-mentioned end of each said body in contact with said mercury to effect electrical contact with said internal electrode coats but not with said electrodes formed on said sides of said bodies; and applying a unidirectional electric polarizing potential between said conductive strip and said yieldable conducting means for a predetermined period of time to polarize said bodies in directions generally between said internal holes and said electroded sides, whereby each of said bodies acquires the electromechanical response characteristic of a linear transducer element.

18. The method of fabricating transducer elements of electro-mechanically sensitive dielectric material capable of retaining remanent electrostatic polarization, comprising: placing a plurality of generally flat, thin bodies of electromechanically sensitive ceramic dielectric material, each of which has at least one hole of capillary width having rough-textured internal walls and extending generally lengthwise into said body from one end thereof, in a support so that said bodies are aligned in a row with spaced edge-to-edge relationship; applying electrically conductive particles in a cementitious medium to both of the generally flat sides of each of said bodies in said row to form outer electrodes on each said body, leaving an unelectroded margin on both sides of each said body near said end thereof; affixing along said row of bodies on each side thereof an individual conductive structure having a strip-like portion fastened in electrical contact with said outer electrode on the respective side of each of said body individually and having a plurality of furcated terminal lead portions extending individually from the regions of said strip-like portion individually adjacent to each said last-mentioned outer electrode; bringing said unitary row of bodies, strung together in relative positions determined by said conductive structures, into contact with a liquid suspension of conductive particles so that only said unelectroded end of each said body is in contact with said suspension to coat said internal walls of said holes with said last-mentioned conductive particles by capillary action, said internal coats then being dried by baking; placing said unitary row of bodies against a yieldable conducting means with only said last-mentioned end of each said body in contact with said conducting means to effect electrical contact with said internal electrode coats but not with said outer electrodes on either side of said bodies; and applying a unidirectional electric polarizing potential between each of said conductive structures connected in parallel and said yieldable conducting means for a predetermined period of time to polarize said ceramic bodies in directions generally between said internal holes and said electroded sides, whereby each of said ceramic bodies acquires the electromechanical response characteristic of a linear transducer element.

19. The method of fabricating a dielectric element containing an internal electrode, comprising the steps of forming at least one through bore of capillary cross-sectional dimension in a body of dielectric material; causing a liquid, capable of wetting said material and containing conductive material, to flow into said bore by capillary action; and drying said liquid in said bore to form an electrode of said conductive material covering substantially all of the internal walls of said bore along which said liquid has flowed.

References Cited in the file of this patent

UNITED STATES PATENTS

| | | |
|---|---|---|
| 2,106,143 | Williams | Jan. 18, 1938 |
| 2,585,752 | Dorst | Feb. 12, 1952 |